(12) United States Patent
Otsubo et al.

(10) Patent No.: US 10,781,856 B2
(45) Date of Patent: Sep. 22, 2020

(54) GATE-TYPE MOVING DEVICE AND THREE-DIMENSIONAL MEASURING MACHINE

(71) Applicant: MITUTOYO CORPORATION, Kanagawa (JP)

(72) Inventors: Seiichi Otsubo, Tochigi (JP); Kenji Ueda, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 304 days.

(21) Appl. No.: 16/028,831

(22) Filed: Jul. 6, 2018

(65) Prior Publication Data

US 2019/0010983 A1 Jan. 10, 2019

(30) Foreign Application Priority Data

Jul. 7, 2017 (JP) ................................ 2017-133323

(51) Int. Cl.
*F16C 32/06* (2006.01)
*G01B 5/008* (2006.01)
(Continued)

(52) U.S. Cl.
CPC ........ *F16C 32/0614* (2013.01); *G01B 5/0004* (2013.01); *G01B 5/008* (2013.01); *F16C 29/025* (2013.01); *F16C 2370/00* (2013.01)

(58) Field of Classification Search
CPC .... G01B 11/002; G01B 21/047; G01B 5/008; G01B 5/016; G01B 11/27; G01B 5/0009; G01B 5/0004
(Continued)

(56) References Cited

U.S. PATENT DOCUMENTS 5,129,733 A 7/1992 Enderle et al.
5,173,613 A * 12/1992 Henry ...................... B23Q 1/03
250/559.19
(Continued)

FOREIGN PATENT DOCUMENTS

JP  H04-217440 A  8/1992
JP  4276667 B2  6/2009
(Continued)

OTHER PUBLICATIONS

U.S. Appl. No. 15/955,078 to Hiroomi HONDA et al., filed Apr. 17, 2018.

*Primary Examiner* — Yaritza Guadalupe-McCall

(74) *Attorney, Agent, or Firm* — Greenblum & Bernstein, P.L.C.

(57) ABSTRACT

The present invention relates to improving precision in a gate-type moving device. The gate-type moving device includes: a base, a gate-type moving body that is placed on the base via an air layer and moves on the base in a non-contact state, and an air bearing that forms the air layer, wherein the gate-type moving body is comprised of two leg parts that stand on an upper surface of the base, a beam portion that connects the leg parts, and a beam-direction moving body that moves along the beam portion, the air bearing is provided at a rear surface of at least one of the leg parts, and comprises an air blowout port that opens toward an upper surface of the base and an air suction port that opens toward the upper surface of the base, and the air suction port sucks air around the air suction port.

20 Claims, 11 Drawing Sheets

(51) Int. Cl.
*G01B 5/00* (2006.01)
*F16C 29/02* (2006.01)

(58) Field of Classification Search
USPC .......................................................... 33/503
See application file for complete search history.

(56) References Cited

U.S. PATENT DOCUMENTS

| | | | | | |
|---|---|---|---|---|---|
| 5,839,202 | A * | 11/1998 | Tezuka | ................... | G01B 5/016 33/503 |
| 6,333,696 | B1 * | 12/2001 | Matsumiya | ............ | B25J 19/063 340/679 |
| 7,290,931 | B2 | 11/2007 | Wardman et al. | | |
| 8,984,876 | B2 * | 3/2015 | Fukuda | ................... | G05B 19/44 60/463 |
| 10,627,259 | B2 * | 4/2020 | Rees | ................... | G01D 5/2449 |
| 2002/0148275 | A1 * | 10/2002 | Abbe | ................... | G01B 21/042 73/1.01 |
| 2007/0271803 | A1 * | 11/2007 | Ishikawa | ................... | G01B 5/28 33/503 |
| 2011/0000277 | A1 * | 1/2011 | MacManus | ............ | G01B 21/10 73/1.79 |
| 2011/0054835 | A1 * | 3/2011 | Takamasu | .............. | G01B 5/008 702/150 |
| 2013/0111774 | A1 * | 5/2013 | McMurtry | ............. | G01B 7/016 33/503 |
| 2013/0227851 | A1 * | 9/2013 | Singh | ................... | G01B 5/0014 33/503 |
| 2014/0059872 | A1 * | 3/2014 | Nakagawa | ........... | G01B 21/045 33/502 |
| 2014/0222372 | A1 * | 8/2014 | Sprenger | ............... | G05B 19/404 702/155 |
| 2014/0222373 | A1 * | 8/2014 | Sprenger | ................ | G01B 5/008 702/155 |
| 2016/0018207 | A1 * | 1/2016 | Fuchs | .................... | G01B 5/004 702/95 |
| 2018/0038960 | A1 * | 2/2018 | Yanaka | ................... | G01S 17/48 |
| 2018/0252302 | A1 * | 9/2018 | Kimura | ................... | G01B 5/012 |
| 2018/0304276 | A1 * | 10/2018 | Hunter | ................. | G01B 5/0004 |
| 2018/0306570 | A1 * | 10/2018 | Angood | ................ | G01B 11/002 |
| 2018/0309354 | A1 * | 10/2018 | Angood | ................ | G01B 21/047 |
| 2020/0080830 | A1 * | 3/2020 | Hunter | ................... | G01B 5/0004 |
| 2020/0149859 | A1 * | 5/2020 | Brown | ................... | G01B 5/008 |

FOREIGN PATENT DOCUMENTS

| | | |
|---|---|---|
| JP | 2011-127699 A | 6/2011 |
| JP | 2016-142542 A | 8/2016 |

\* cited by examiner

I — I cross-sectional view

II — II cross-sectional view

GATE-TYPE MOVING DEVICE AND THREE-DIMENSIONAL MEASURING MACHINE

RELATED APPLICATIONS

This application claims the priority of Japanese Patent Application No. 2017-133323 filed on Jul. 7, 2017, which is incorporated herein by reference.

FIELD OF THE INVENTION

The present invention relates to improvement of measurement precision in a gate-type moving device and a three-dimensional measuring machine.

BACKGROUND OF THE INVENTION

A three-dimensional measuring machine measures a three-dimensional shape of a measurement target with high precision by moving a measuring probe mounted to a drive mechanism in X-axis, Y-axis, and Z-axis directions with respect to the measurement target on a table, and is used in various industrial fields. Lately, air bearings are provided to three-dimensional measuring machines, so that drive mechanisms can be operated smoothly to improve measurement precision further.

In recent years, disposition of air bearings is contrived, and various types of air bearings have been developed. In industrial devices, air bearings are suitably selected in accordance with its application. For example, Patent Literature 1 discloses that air bearings are disposed to interpose a surface plate in vertical direction to enhance stiffness (FIG. 3 of Patent Literature 1).

Further, Patent Literature 2 discloses that a lid member is comprised by contriving the shape of the inner air exhaust passage of the air bearing, so that the air bearing body can be processed easily even when the air bearing body is enlarged. It also discloses that the air bearing has an air intake passage to suck to a target. Further, Patent Literature 3 discloses that a machine portion to be guided is supported on a table by three air bearings, and a bell-shaped sucker that operates by negative pressure is provided at a substantial center that the three air bearings are disposed, so that stiffness of the air bearing is enhanced and the machine portion can be stably supported on the table.

Patent Literature 4 discloses vacuum preloaded air bearings that can enhance stiffness of air bearings in a simple configuration by comprising: a first flow passage that receives compressed gas from outside; a second flow passage that generates negative pressure to a recessed part (vacuum preloaded part) of a bearing surface; a third flow passage that supplies positive pressure to a bearing part of the bearing surface; and a negative pressure generating device that generates negative pressure.

PRIOR ART LITERATURES

Patent Literature

PATENT LITERATURE 1: Japanese Unexamined Patent Application Publication No. 2016-142542
PATENT LITERATURE 2: Japanese Unexamined Patent Application Publication No. 2011-127699
PATENT LITERATURE 3: Japanese Unexamined Patent Application Publication No. H04-217440
PATENT LITERATURE 4: Japanese Patent No. 4276667

DISCLOSURE OF THE INVENTION

Problem to be Solved by the Invention

As described above, various types of air bearings have been developed recently, and are used in accordance with their applications. However, when vacuum preloaded air bearings disclosed in Patent Literatures 1, 2, and 4 are used in gate-type moving devices or three-dimensional measuring machines, the configuration of such devices may become complicated. Further, according to investigations of the present inventors, a gate-type moving device having vacuum preloaded air bearings described in Patent Literatures 2 to 4 has not been developed so far.

Means to Solve the Problem

The present invention has been made in view of the problems of the prior art, and the object is to provide a gate-type moving device that is simplified in overall configuration and is capable of moving with high precision compared to conventional gate-type moving devices.

To achieve the above-mentioned object, a gate-type moving device according to the present invention comprises:
  a base,
  a gate-type moving body that is placed on the base via an air layer and moves on the base in a non-contact state, and
  an air bearing that forms the air layer,
  wherein the gate-type moving body is comprised of two leg parts that stand on an upper surface of the base, a beam portion that connects the leg parts, and a beam-direction moving body that moves along the beam portion,
  the air bearing is provided at a rear surface of at least one of the leg parts, and comprises an air blowout port that opens toward an upper surface of the base and an air suction port that opens toward the upper surface of the base, and
  the air suction port sucks air around the air suction port to apply preload to the air bearing.

Further, according to the gate-type moving device of the present invention, the air bearing incorporates an ejector for generating negative pressure, and the gate-type moving device does not have a negative pressure generating device for supplying negative pressure to the air bearing.

Further, according to the gate-type moving device of the present invention, the ejector is provided detachably inside the air bearing.

Further, according to the gate-type moving device of the present invention, the air bearings are provided at rear surfaces of the two leg parts.

Further, according to the gate-type moving device of the present invention, the air bearing is provided to at least one of the leg parts, and the air blowout port and the air suction port are disposed to face a side surface of the base.

Further, according to the gate-type moving device of the present invention, a driving means of the gate-type moving body is a friction driving means.

Further, according to the gate-type moving device of the present invention, the beam-direction moving body is provided with a spindle that is movable in a vertical direction with respect to the base, and the gate-type moving device is a three-dimensional measuring machine that can detect a position coordinate of a measurement target placed on the base to measure a three-dimensional shape of the measurement target.

Effect of the Invention

According to the present invention, the vacuum preloaded air bearing for applying preload to the rear surface of the at least one of the leg parts is provided to the gate-type moving body of the gate-type moving device, so that the air bearing may obtain good stiffness, and the gate-type moving device capable of moving with highly precision may be provided. The vacuum preloaded air bearing that is used in the gate-type moving device according to the present invention preferably incorporates the ejector as the negative pressure generating part in the air bearing. By using the vacuum preloaded air bearing having such configuration, there is no need to provide a negative pressure generating device dedicated to generate negative pressure externally, and a simplified gate-type moving device capable of sufficient preload may be achieved.

BEST MODE FOR CARRYING OUT THE INVENTION

Hereinbelow, a gate-type moving device of the present invention is described with reference to figures. The present invention is not limited to the examples described herein as long as the scope of the present invention is not exceeded. Further, a three-dimensional measuring machine is described with reference to figures as a specific embodiment of the gate-type moving device.

Figure 1:
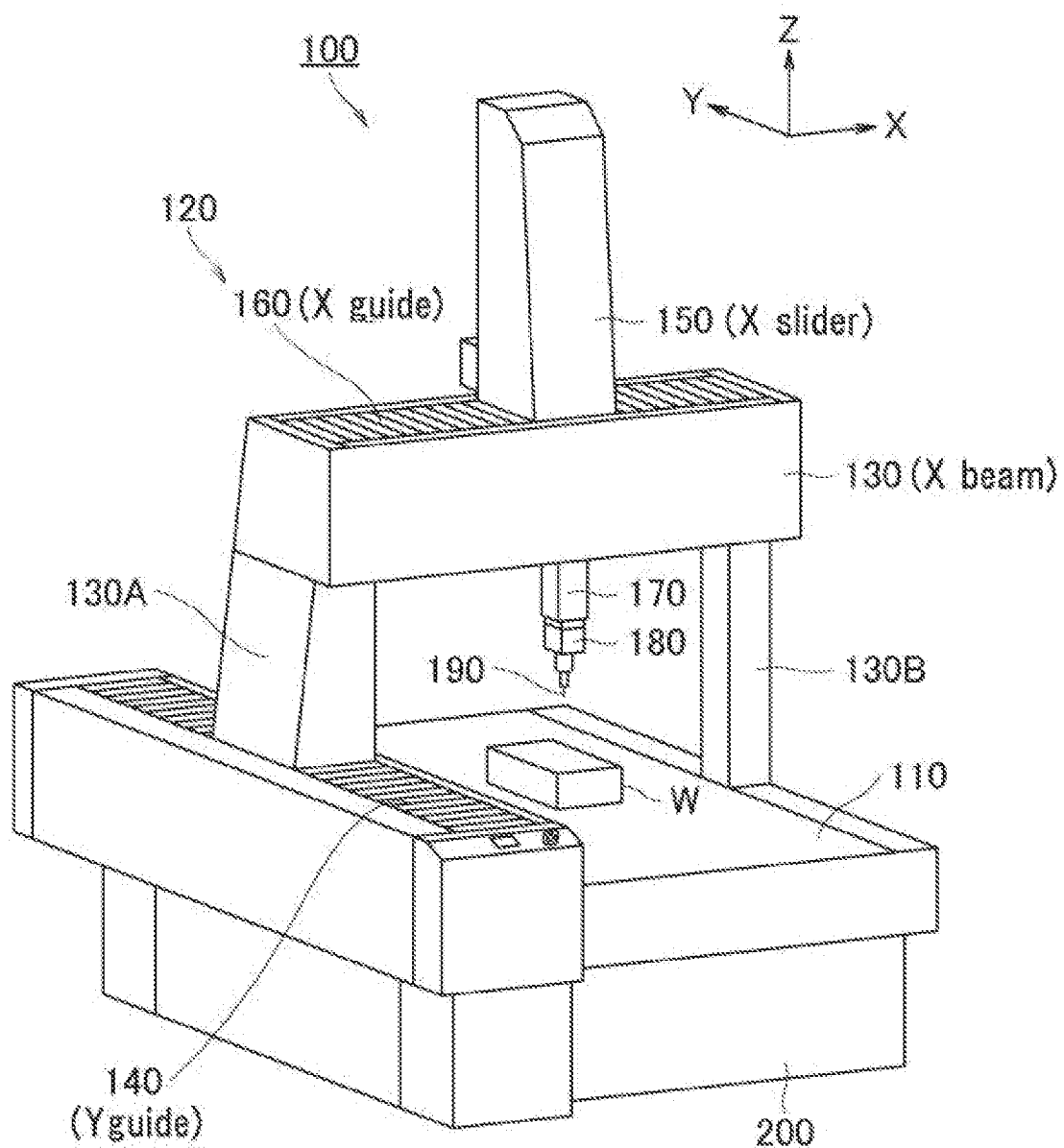
FIG. 1 is a schematic diagram of the three-dimensional measuring machine according to an embodiment of the present invention.

FIG. 1 is a schematic diagram of the three-dimensional measuring machine according to an embodiment of the present invention. The three-dimensional measuring machine 100 shown in FIG. 1 comprises: a base 110; a gate-type slider 120 as a gate-type moving body that is movable in Y-axis direction; a Y-guide 140 provided at a bottom part of a leg part 130A of the gate-type slider 120; an X-slider 150 (beam-direction moving body) that moves along an X-beam 130, which is a cross-beam part (beam part that connects the leg parts) of the gate-type slider 120; an X-guide 160 that guides the X-slider 150 in X-axis direction; a spindle 170 provided to be liftable in Z-axis direction with respect to the X-slider 160; a measuring head 180 provided at a lower end of the spindle 170; and an installation table 200.

The Y-guide 140 provided at one end side of an upper surface of the base 110 and a Y-slider (not shown) movable in Y-axis direction by the Y-guide constitute a Y-axis moving device. Further, the X-guide 160 provided to the X-beam 130 of the gate-type slider 120 and the X-slider 150 constitute an X-axis moving device. Further, a Z-guide (not shown) mounted to the X-slider 150 and the spindle 170 constitute a Z-axis moving device. The spindle 170 is a long member that is elongated in vertical direction, and the measuring head 180 at a lower end thereof is provided with a measuring probe (for example, a contact-type measuring probe 190) in accordance with measurement purposes. The measuring probe in the present embodiment is not limited to contact types, and non-contact type measuring probes may be used too.

The base 110 installed on the installation table 200 is a surface plate made of stone, cast iron, or concrete, and a measurement target (work) W is placed on its upper surface. The three-dimensional measuring machine 100 configured as described above respectively reads out moving positions of the Y-slider, X-slider 150, and the spindle 170 when a contactor at an end of the measuring probe 190 contacts the measurement target W placed on the base 110, and calculates position coordinates of the surface of the measurement target W. Thus, surface shape data of the measurement target W can be provided to a measurer.

Needless to say, measurement precision of the measuring probe 190 is important for detecting the position coordinate precisely. In particular, driving precision of the gate-type slider 120 for moving the measuring probe 190 has a great effect on measurement precision of the three-dimensional measuring machine 100. Recently, air bearings are often used to improve driving precision (movement precision) of the gate-type slider 120 as a drive mechanism. Accordingly, driving precision of the gate-type slider 120 may be improved by using air bearings to the three-dimensional measuring machine 100.

Figure 2:
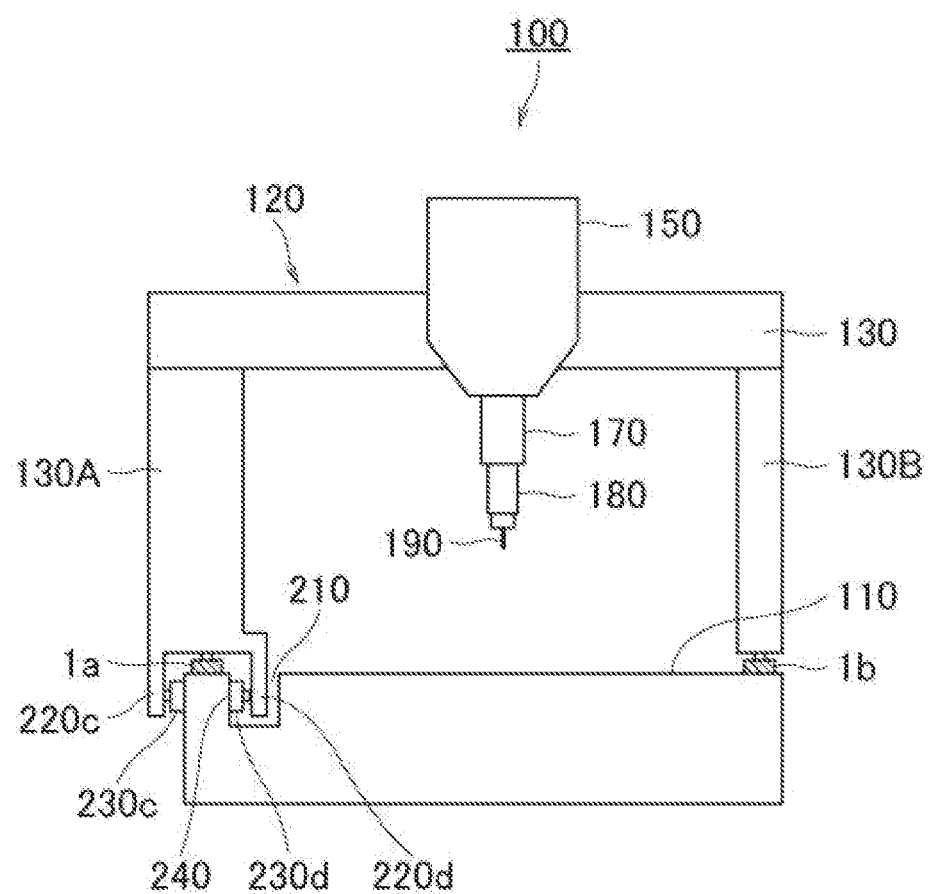
FIG. 2 is a schematic diagram of a front view of the three-dimensional measuring machine according to the embodiment of the present invention (viewing from X-direction).

FIG. 2 shows a schematic diagram of a front view of the three-dimensional measuring machine according to the embodiment of the present invention (from Y-direction in FIG. 1). In FIG. 2, the Y-guide 140 and the installation table 200 in FIG. 1 are omitted to make explanation easier to understand. As shown in FIG. 2, the leg parts 130A and 130B of the gate-type slider 120 are placed on the base 110, and air bearings 1a and 1b that are the characteristic feature of the present invention and will be described below are provided between the rear surfaces of the leg parts 130A and 130B and the upper surface of the base 110, respectively. Further, as shown in FIG. 2, a base recessed part 210 is provided as a groove at a part of an upper surface of the base 110 (on the leg part 130A side). The leg part 130A has a recessed shape to face the upper surface of the base 110. A recessed part wall 220c as one of a recessed part forming wall that forms this recessed part faces the side surface of the base 110, and a recessed part wall 220d as the other of the recessed part forming wall is located inside the base recessed part 210.

An air bearing 230c is provided between the recessed part wall 220c of the leg part 130A and the side surface of the base 110, and an air bearing 230d is provided between the recessed part wall 220d and the base recessed part wall 240 in the base recessed part 210. Such configuration allows the gate-type slider 120 to move smoothly in X-axis direction in FIG. 1. Similarly, air bearings may be provided respectively at specific positions to make movement in Y-axis and Z-axis direction smooth.

The above-described air bearings are desirably preloaded in a certain amount to maintain stiffness. When air bearings are used in industrial machines and the like, they are generally preloaded by the self-weight of the machine in vertical direction (the self-weight of the gate-type slider 120 in the three-dimensional measuring machine 100 in FIG. 1).

However, preload is not sufficient only with the self-weight of the machine in practice. In industrial equipment of which the weight of the machine itself changes, stability of preload is deteriorated, and thus stiffness of air bearings cannot be maintained. For example, in the three-dimensional measuring machine 100 in FIG. 1, stability is difficult to maintain since load variation occurs in X-axis direction when the X-slider 150 moves along the X-beam 130 (X-guide 160). Further, for example, when disposition of air bearings described in Patent Literature 1 is adopted and two air bearings are provided to interpose the base 110 in vertical direction in the three-dimensional measuring machine 100, configuration of the three-dimensional measuring machine itself becomes complicated.

In the present embodiment, the above-mentioned problems are solved by replacing conventional air bearings with vacuum preloaded air bearings that can be preloaded by negative pressure. Specifically, the air bearings at the rear surfaces of the leg parts 130A and 130B of the gate-type slider 120 are replaced with vacuum preloaded air bearings 1 (1a and 1b). By configuring in such way, the base 110 does not have to be interposed with air bearings, and preload that was insufficient only with the self-weight of the machine may be applied in a sufficient amount. Thus, stiffness of air bearings may be enhanced. Hereinbelow, specific configuration and features of the vacuum preloaded air bearings in the present embodiment are described.

Vacuum Preloaded Air Bearings

Figure 3:
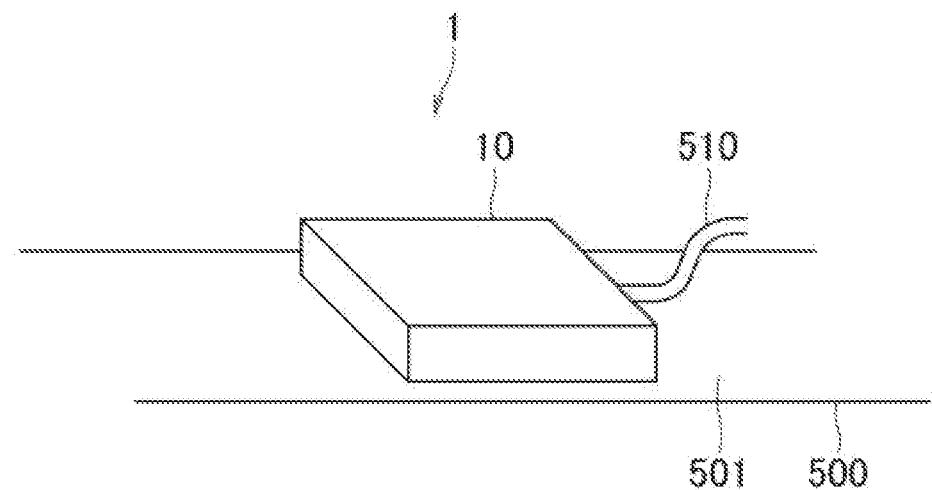
FIG. 3 is a schematic diagram of the vacuum preloaded air bearing used in the three-dimensional measuring machine according to the embodiment of the present invention.
Figure 4:
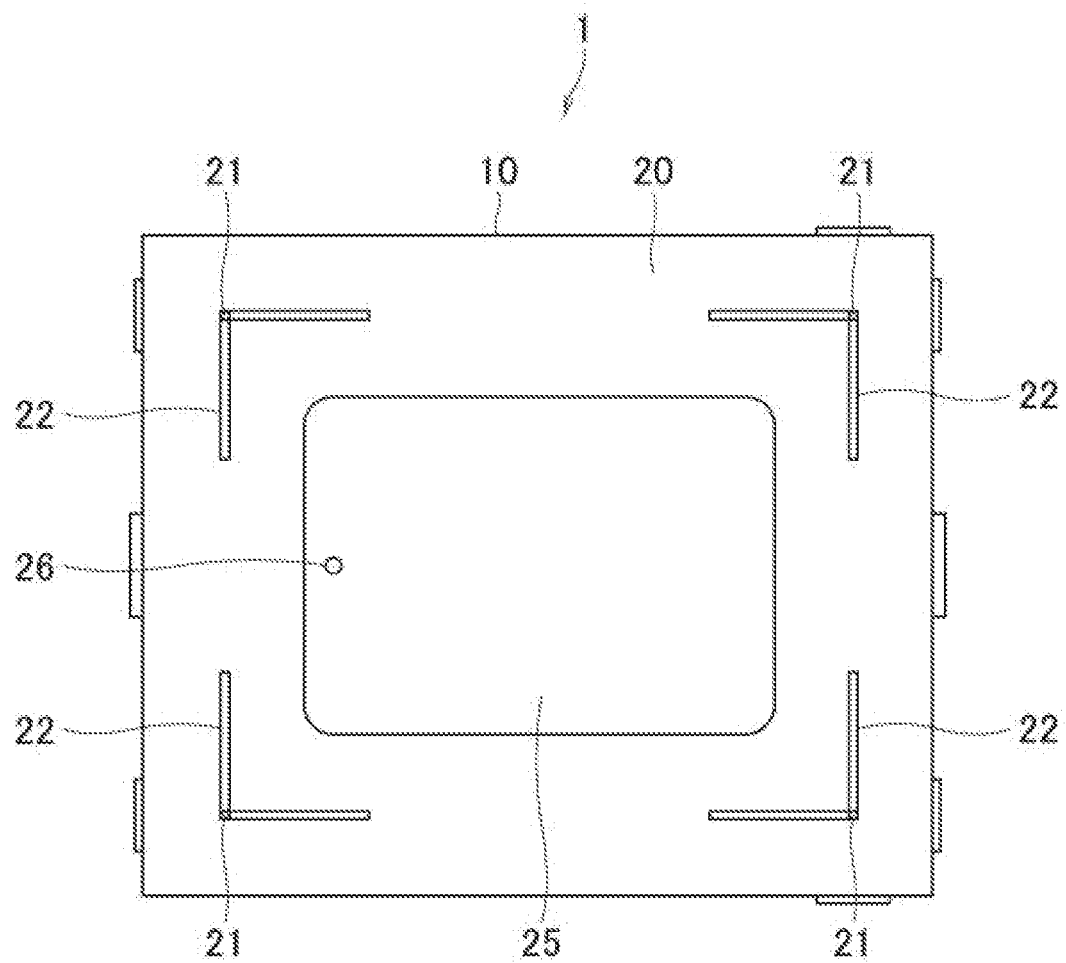
FIG. 4 is a schematic diagram of the bearing surface side of the vacuum preloaded air bearing according to the embodiment of the present invention.

Referring to FIGS. 3 and 4, an external configuration of the vacuum preloaded air bearings (hereinbelow, referred to as VPAB (Vacuum Preloaded Air Bearings)) used in the three-dimensional measuring machine 100 according to the embodiment of the present invention is described. FIG. 3 is a schematic diagram for describing the external configuration of the VPAB. FIG. 4 shows a bearing surface 20 side of the VPAB.

As shown in FIG. 3, a VPAB 1 is mounted to a guide rail 500 of a guide mechanism. The VPAB 1 is a non-contact bearing that interposes an air film between a guide surface 501 of the guide rail 500 and the bearing surface 20 (FIG. 4). A stone surface plate is used as the guide surface 501, but it is not limited thereto. It can be of other materials as long as it is a plate-shape member having flatness required for using the VPAB 1. For example, the guide surface 501 may be made of iron, aluminum, stainless steel, glass, or acrylic.

The VPAB 1 has a main body part 10 having a rectangular parallelepiped shape. Although the VPAB 1 of the present embodiment is a rectangular parallelepiped shape, it may be of other shapes. The main body part 10 is made of metal, for example, and is connected to a compressor that supplies compressed air with a sufficient flow rate (for example, 0.5 MPa or more, and 15 L/min or more) through a supply path 510. A flow path part (described later) is provided inside the main body part 10, and the supplied compressed air flows therethrough. Further, at the bottom surface of the main body part 10, a bearing surface 20, an air supply hole 21, a groove part 22, a recessed part 25, and a suction hole 26 are provided.

The bearing surface 20 faces the guide surface 501 of the guide rail 500 (FIG. 3). When compressed air is supplied to the VPAB 1, an air film formed by compressed air is interposed between the bearing surface 20 and the guide surface 501.

The air supply hole 21 is a through-hole that provides communication between the bearing surface 20 and the flow path part in the main body part 10, and supplies compressed air toward the guide surface 501. Accordingly, the air film is formed by compressed air between the bearing surface 20 and the guide surface 501 (an air supply region). The air supply hole 21 is a small hole having a diameter of about 0.2 (mm), for example, and is provided at four corners of the bottom surface of the main body part 10.

The groove part 22 is provided in an L-shape at four corners of the bottom surface of the main body part 10 to communicate with the air supply hole 21. Although the four groove parts 22 are spaced apart from each other, they are not limited as such, and may be connected. Compressed air supplied by the air supply hole 21 flows along the groove part 22, so that the air film is formed between the bearing surface 20 and the guide surface 501. The air film may be formed without the groove part 22, but when the groove part 22 is provided, the air film may be stably formed in a uniform thickness over a larger area.

The recessed part 25 is a recessed region formed on the same surface as the bearing surface 20. The recessed part 25 is recessed by a predetermined depth from the bearing surface 20. The recessed part 25 is formed in a rectangular shape in a center region of the bottom surface.

The suction hole 26 is a through-hole that provides communication between the recessed part 25 and the flow path part in the main body part 10, and sucks air in the recessed part 25 (air between the main body part 10 and the guide surface 501 (a suction region)). The suction hole 26 sucks air in the recessed part 25 by negative pressure that is generated by a negative pressure generating part provided to the flow path part in the main body part 10. Accordingly, suction force (vacuum preload) may be generated in the recessed part 25. This suction force is proportional to the area of the recessed part 25. In this case, about 0.8 (kgf) is generated per 1 (cm$^2$). Therefore, suction force of about 40 (kgf) may be generated when the area of the recessed part 25 is 50 (cm$^2$), for example.

In the VPAB 1 according to the present embodiment, even when load supported by the VPAB 1 is small, air in the recessed part 25 of the main body part 10 is sucked by negative pressure generated by the negative pressure generating part in the main body part 10, so that load for attracting the main body part 10 to the guide surface 501 side is applied. Accordingly, the VPAB 1 may be used with the air film having the optimum thickness, and stiffness of the air film may be enhanced.

Figure 5:
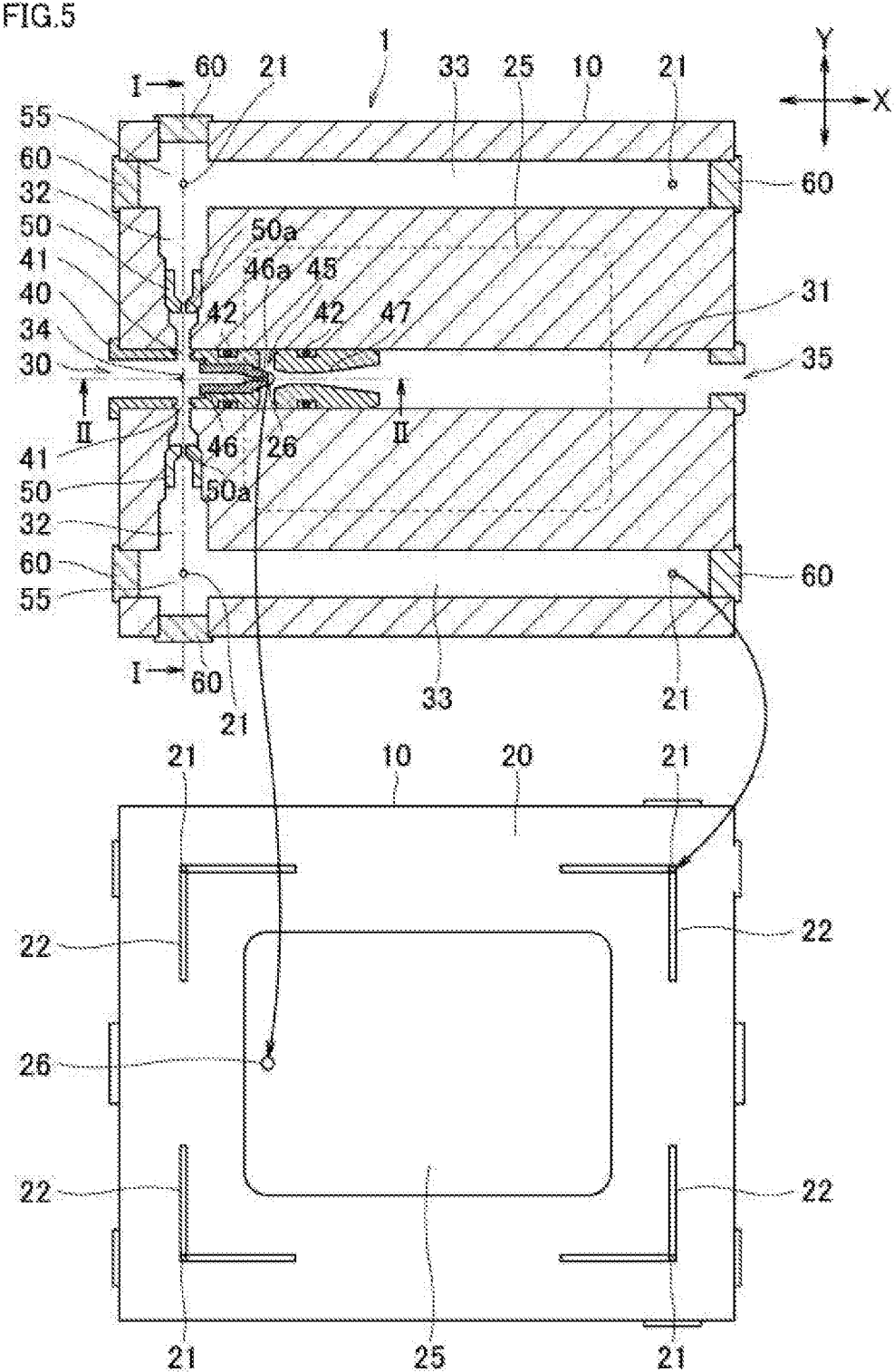
FIG. 5 shows an internal configuration of the vacuum preloaded air bearing according to the embodiment of the present invention.
Figure 6:
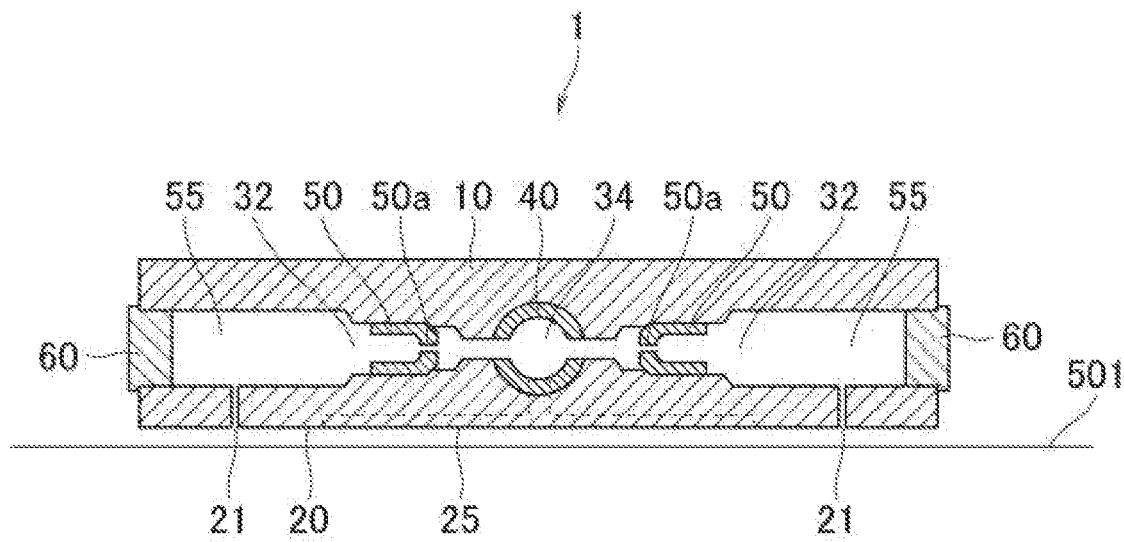
FIG. 6 is a I-I cross-sectional view of FIG. 5.
Figure 7:
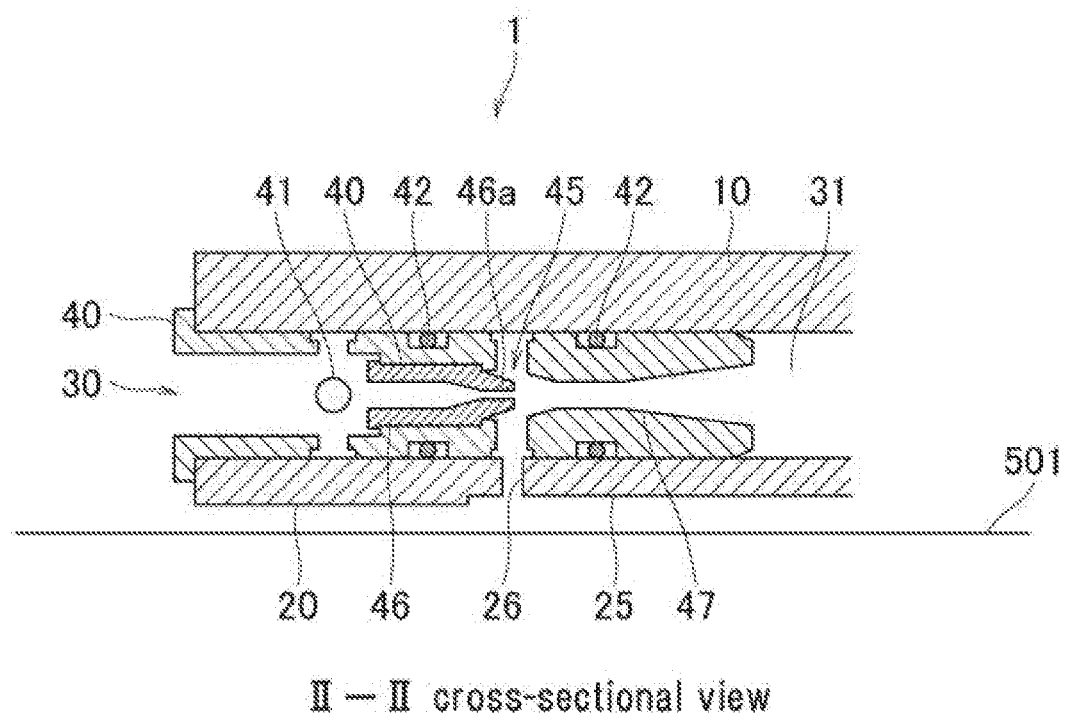
FIG. 7 is a II-II cross sectional view of FIG. 5.

Next, the internal configuration of the VPAB 1 is described with reference to FIGS. 5 to 7. FIG. 5 shows the internal configuration of the VPAB 1 (and positional relationship with FIG. 4). FIG. 6 is a I-I cross-sectional view of FIG. 5, and FIG. 7 is a II-II cross-sectional view of FIG. 5.

As shown in FIG. 5, the VPAB 1 has an inflow port 30, flow path parts 31, 32, 33, a branch part 34, an exhaust port 35, a vacuum ejector 40, a negative pressure generating part 45, and a restricting part 50. In the present embodiment, the flow path parts 32 and 33 correspond to a first flow path part, and the flow path part 31 corresponds to a second flow path part.

The inflow port 30 is an opening that compressed air supplied from the supply path 510 (FIG. 3) flows into. The inflow port 30 is located at one end side of the flow path part 31. Further, although it is not shown in FIG. 5, the inflow port 30 is connected to the supply path 510.

The flow path parts 31, 32, and 33 are provided in the main body part 10, and are flow paths through which compressed air from the inflow port 30 flows. The flow path parts 31 and 33 are provided along X-axis direction in FIG. 5. The flow path parts 32 and 33 have the above-described air supply holes 21, and the flow path part 31 has with the above-described suction hole 26. Plugs 60 for closing the openings are provided at the openings at the end parts of the flow path parts 32 and 33.

The branch part 34 is provided on the middle of the flow path part 31, and is a part to direct a part of compressed air flowing from the inflow port 30 toward the flow path part 32. Compressed air from the inflow port 30 reaches the branch part 34, and is branched into three directions by the branch part 34. Compressed air diverted from the branch part 34 to the flow path part 32 flows through the flow path parts 32 and 33. At this time, compressed air is supplied from the air supply hole 21 to the guide surface 501.

The exhaust port 35 is an opening provided on the opposite side of the inflow port 30 in the flow path part 31. Compressed air flowing through the flow path part 31 is exhausted from the exhaust port 35 to atmosphere. Suction air (air in the recessed part 25) that is sucked by negative pressure (about −80 (kPa)) generated by the negative pressure generating part 45 is also exhausted from the exhaust port 35 to atmosphere.

The vacuum ejector 40 has a function of generating negative pressure by using compressed air. The vacuum ejector 40 is a metal or resin mounting member that is detachably mounted on the inflow port 30 side of the flow path part 31. For example, the vacuum ejector 40 has a screw part that can be coupled to the flow path part 31. The vacuum ejector 40 has a cylindrical shape, and compressed air passes therethrough. O-rings 42 are provided as seal members at two positions between the outer circumferential surface of the vacuum ejector 40 and the inner wall of the flow path part 31.

The vacuum ejector 40 is provided with an opening 41 at a position corresponding to the branch part 34, so that compressed air can be diverted to the flow path part 32. Further, as shown in FIG. 5, the vacuum ejector 40 has the negative pressure generating part 45 and a diffuser part 47.

The negative pressure generating part 45 increases the flow velocity of compressed air that passes through the inside the vacuum ejector 40, and generates negative pressure for sucking air in the recessed part 25. By generating such negative pressure, the air film can be preloaded to enhance stiffness of the air film. That is, the thickness of the air film does not substantially change when the load supported by the air bearing 1 is changed. The preload amount is the product of negative pressure generated by the negative pressure generating part and the area of the recessed part 25. In this case, since suction force is about 0.8 (kgf/cm$^2$), suction force is about 40 (kgf) when the area of the recessed part 25 is 50 (cm$^2$), for example.

The negative pressure generating part 45 has an exchangeable nozzle part 46. The nozzle part 46 narrows the flow path of the flow path part 31 to increase the flow velocity of compressed air. The tip side of the nozzle part 46 is formed in a conical shape, and the flow velocity of compressed air is increased at the tip of the nozzle part. Specifically, the flow velocity of compressed air increases in accordance with the diameter of the opening 46a at the tip of the nozzle part 46 (for example, the diameter is 0.5 (mm) to 1.0 (mm)). When the flow velocity of compressed air increases at the tip of the nozzle part, pressure around the tip of the nozzle decreases to generate negative pressure.

In the present embodiment, the tip of the nozzle part 46 is located right above the suction hole 26, so that negative pressure is generated around the suction hole 26. In accordance with Bernoulli's principle of negative pressure generation, negative pressure is generated in a direction perpendicular to the flow of compressed air. In this case, negative pressure is generated in a direction from the suction hole 26 toward the tip of the upper nozzle part 46. By generating such negative pressure, air in the recessed part 25 passes through the suction hole 26 and flows into the flow path part 31. Air that flows into the flow path part 31 is exhausted from the exhaust port 35 to atmosphere together with compressed air.

The diffuser part 47 is a part that increases compression by decreasing the flow velocity of air flowing from the suction hole 26 (converts kinetic energy to pressure energy).

The restricting part 50 is a part where the flow path of the flow path part 32 is narrowed. The restricting part 50 is located between the branch part 34 and the air supply hole 21 in the flow path part 32. The restricting part 50 is provided in the upstream side of the air supply hole 21, so that excessive flow rate of compressed air toward the sir supply hole 21 can be suppressed (two-stage restricting method). In this case, flow rate of compressed air is adjusted in accordance with the diameter $d_0$ of an opening 50a at the tip of the restricting part 50. For example, when there are two air supply holes 21 having a diameter $d1=0.2$ (mm), the diameter can be generally calculated by $d_0 \leq (n)^{1/2} \times d_1$, $d_0 \leq (2)^{1/2} \times 0.2 \approx 0.28$. Therefore, the size of the diameter is suitably 0.28 (mm) or less. Accordingly, flow rate of compressed air supplied from the air supply hole 21 decreases, and the thickness of the air film can be suppressed from being large. Thus, deterioration in stiffness of the air film can be suppressed.

Self-excited vibration, which is unstable vibration, is likely to be generated in general air bearings. However, the restricting part 50 is provided in the present embodiment, so that self-excited vibration of the VPAB 1 can be effectively suppressed by an air chamber 55 provided between the restricting part 50 and the air supply hole 21.

The air chamber 55 is a part where the flow path of the flow path part 32 is expanded, and is located around of the air supply hole 21. Further, the air chamber 55 is formed to intersect with the flow path part 33. By providing the air chamber 55, air pressure (back pressure) can be applied equally to two air supply holes 21. As a result, flow rate of air supplied from each air holes 21 becomes equal. Thus, the thickness of the air film becomes uniform and deterioration in stiffness of the air film can be effectively suppressed.

When air between the guide surface 501 and the main body part 10 is sucked by the negative pressure generating part 45, dust, dirt and the like attached to the guide surface 501 are likely to enter the vacuum ejector 40. In such case, the diffuser part 47 and the like of the vacuum ejector 40 may be clogged up by the dust, dirt and the like. In the present embodiment, the vacuum ejector 40 is detachably mounted to the main body part 10 as described above, so that the vacuum ejector 40 can be detached to be cleaned when it is clogged up or exchanged when it is broken.

Flow of Compressed Air

Figure 8:
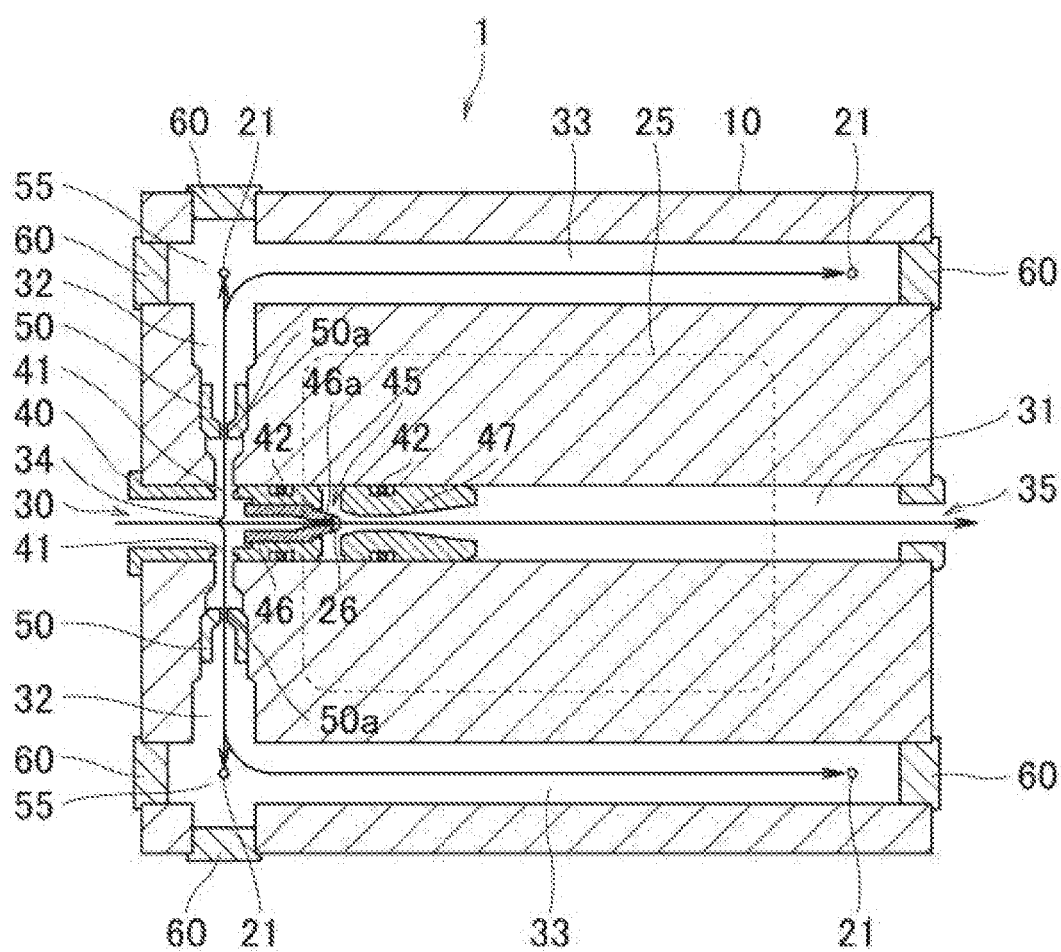
FIG. 8 is a schematic diagram for describing the flow of compressed air inside the air bearing according to the embodiment of the present invention.
Figure 9:
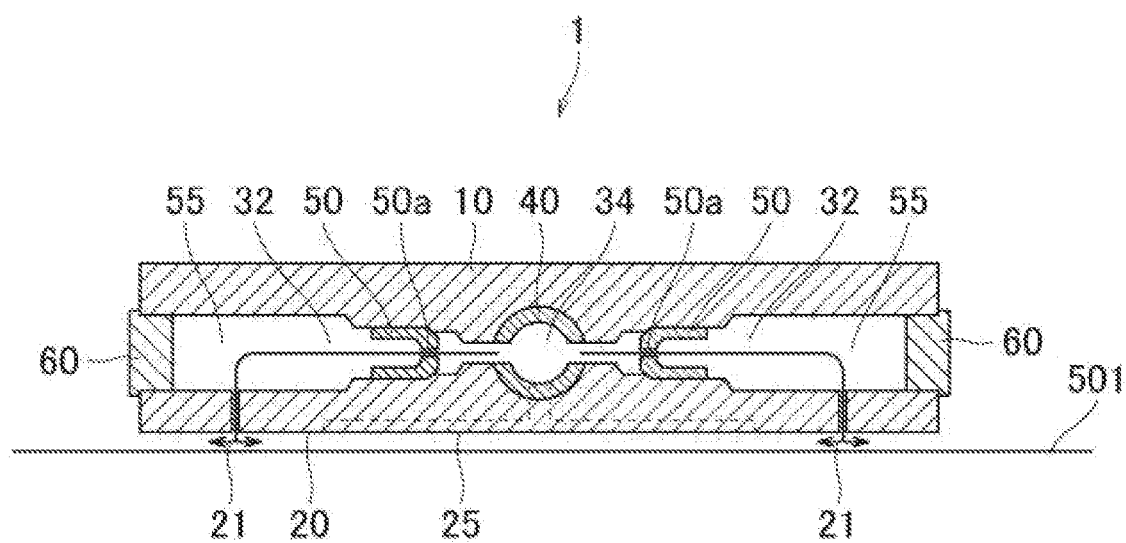
FIG. 9 is a schematic diagram for describing the flow of compressed air inside the air bearing according to the embodiment of the present invention.
Figure 10:
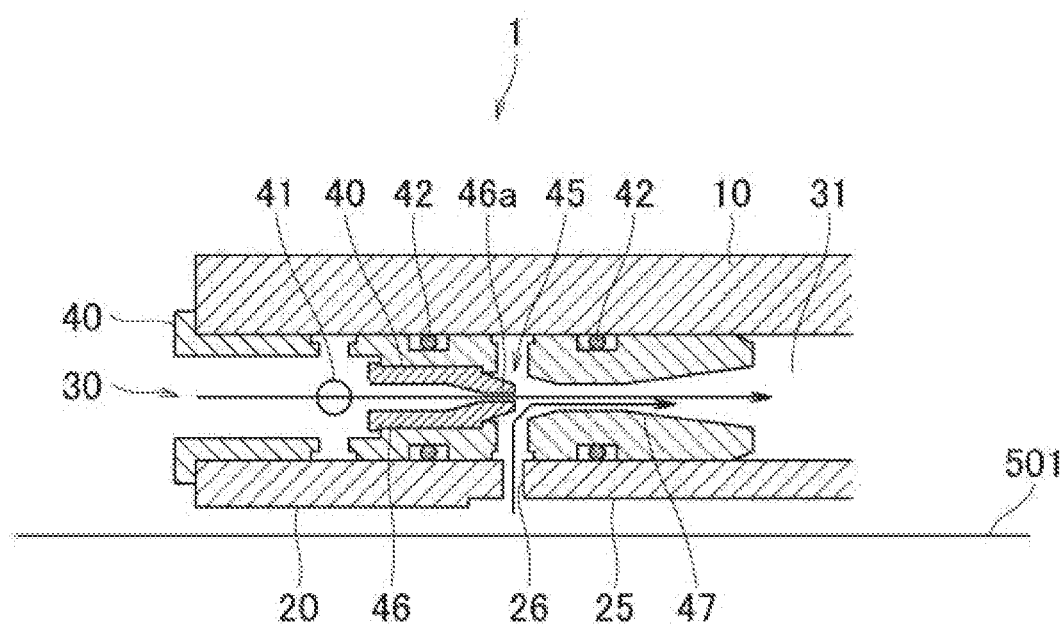
FIG. 10 is a schematic diagram for describing the flow of compressed air inside the air bearing according to the embodiment of the present invention.

Next, flow of compressed air in the above-described air bearings is described. FIGS. 8 to 10 are figures to describe flow of compressed air in the VPAB 1. In FIGS. 8 to 10, flow of air is indicated with bold lines.

Compressed air supplied via the supply path 510 (FIG. 3) flows from the inflow port 30 to the flow path part 31. Compressed air flows through the flow path part 31, and is diverted into three directions at the branch part 34, as shown in FIG. 8, without air pressure being decreased if the air flow amount from the compressor is sufficient. That is, a portion of compressed air flows respectively to two flow path parts 32 disposed symmetrically, and the rest of compressed air flows straight in the branch part 34 toward the negative pressure generating part 45. Self-excited vibration can be suppressed by disposing the flow paths 32 symmetrically in such way.

The air flow amount of compressed air that flows from the branch part 34 to the flow path part 32 is restricted by the restricting part 50, and then compressed air flows toward the air chamber 55 and the flow path part 33. As shown in FIG. 9, compressed air is supplied from the air supply hole 21 to the guide surface 501, so that the air film is formed between the bearing surface 20 and the guide surface 501.

On the other hand, the flow velocity of compressed air proceeding straight from the branch part 34 to the negative pressure generating part 45 is increased at the tip of the nozzle part 46. As the flow velocity of compressed air increases, pressure around of the suction hole 26 in the negative pressure generating part 45 decreases, and negative pressure is generated. Then, as shown in FIG. 10, air in the recessed part 25 flows into the flow path part 31 via the suction hole 26 by negative pressure, and is exhausted from the exhaust port 35 to atmosphere together with compressed air.

The above-described vacuum preloaded air bearing (VPAB) is used to the three-dimensional measuring machine 100, so that the three-dimensional measuring machine maintaining stiffness and capable of measurement with high precision can be achieved.

Simplification of the Configuration of the Three-Dimensional Measuring Machine

Figure 11:
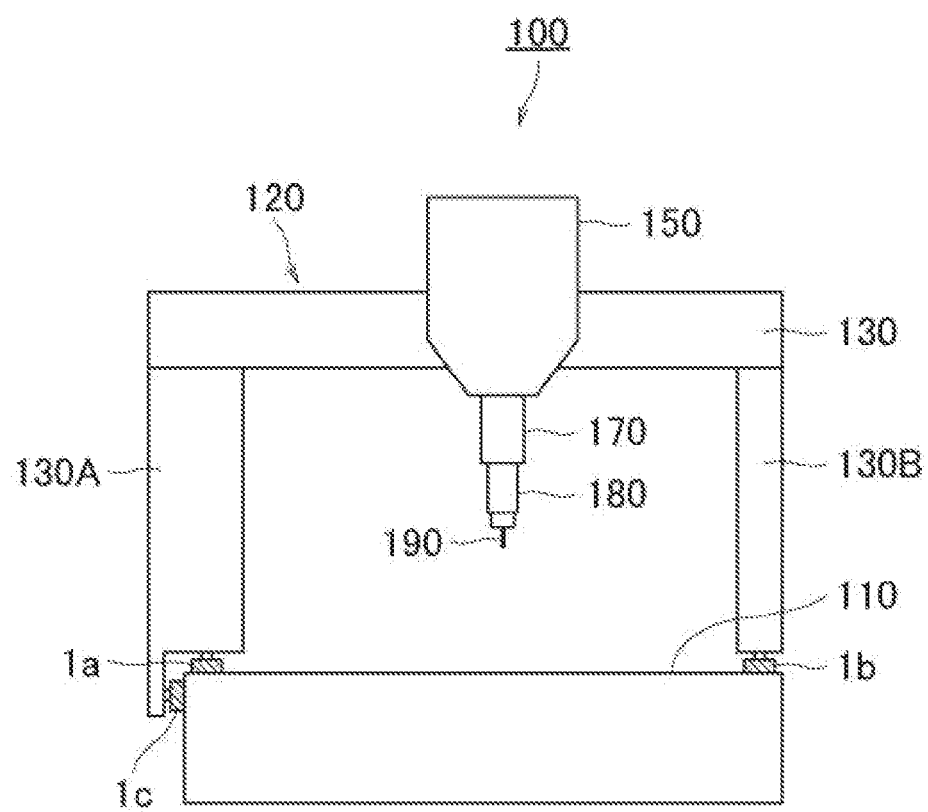
FIG. 11 is a schematic diagram of disposition of the air bearings when the three-dimensional measuring machine according to the embodiment of the present invention is simplified.

FIG. 11 shows a schematic drawing of a three-dimensional measuring machine having a simplified configuration by contriving disposition of air bearings. In the three-dimensional measuring machine 100 shown in FIG. 11, all air bearings are replaced with VPAB 1 (1a, 1b, 1c) to generate preload (vacuum preload) respectively, so that stiffness of the air bearing (or the air film) is enhanced. Therefore, number of air bearings can be reduced compared to the three-dimensional measuring machine 100 of FIG. 2. Specifically, when compared to the three-dimensional measuring machine 100 of FIG. 2, the air bearing 230c is replaced with the VPAB 1c, so that preload can be applied to the side surface of the base 110 only by the VPAB 1c, and the air bearing 230d may be omitted. Accordingly, the base recessed part 210 does not have to be provided to the base 110, and the three-dimensional measuring machine having a simplified configuration while maintaining suitable stiffness of the air bearing (or the air film) can be achieved.

Further, vacuum preload is generated by replacing the air bearing 1b provided at the tip of the leg part 130B with this VPAB1, so that floating of the leg part 130B generated by a large variation of the load applied to the leg part 130B when the gate-type moving body 120 is acceleratedly/deceleratedly driven in Y-direction can be suppressed. Thus, precision and speed of the three-dimensional measuring machine 100 can be increased.

Further, a frictional driving means facing the side surface or the upper surface of the base 110 is preferably used for moving the gate-type slider 120 in Y-axis direction. Configuration can be further simplified compared to ball screw driving means or belt driving means, and cost reduction can be achieved. At the same time, the gate-type slider 120 can be easily separated from the base 110, and the three-dimensional measuring machine 100 can be easily transported.

According to the three-dimensional measuring machine of the present invention, the gate type moving body 120 of the three-dimensional measuring machine 100 is provided with a vacuum preloaded air bearing 1 for applying preload to the rear surface of at least one of the leg part 130A, so that the air bearing 1 can obtain good stiffness, and the three-dimensional measuring machine 100 capable of highly precise measurement can be provided. Further, the vacuum preloaded air bearing used in the three-dimensional measuring machine of the present invention preferably incorporates the ejector 40 in the air bearing 1 as the negative pressure generating part. By using the vacuum preloaded air bearing 1 having such configuration, there is no need to provide the negative pressure generating device dedicated to generate negative pressure externally, and a simplified gate-type moving machine 100 capable of sufficient preload may be achieved.

By replacing all of the conventional air bearings 230 with vacuum preloaded air bearings 1 and contriving disposition of air bearings, the three-dimensional measuring machine 100 having simplified configuration and is reduced in weight and cost can be achieved.

DESCRIPTION OF REFERENCE NUMBERS

1. Vacuum preloaded air bearing (VPAB)
10. Main body part
20. Bearing surface
21. Air supply hole
26. Suction hole
30. Inflow port
31~33. Flow path part
40. Vacuum ejector
46. Nozzle part
50. Restricting part
55. Air chamber
100. Three-dimensional measuring machine (Gate type moving device)
110. Base
120. Gate type slider (gate type moving body)
130. X beam (beam-direction moving body)
130A. Leg part
130B. Leg part 140. Y guide
150. X slider
160. X guide
170. Spindle
180. Measuring head
190. Measuring probe
200. Installation table
210. Base recessed part
230. Air bearing
240. Base recessed part wall
500. Guide rail
501. Guide surface
510. Supply path

The invention claimed is:

1. A gate-type moving device comprising:
a base,
a gate-type moving body that is placed on the base via an air layer and moves on the base in a non-contact state, and
an air bearing that forms the air layer,
wherein the gate-type moving body is comprised of two leg parts that stand on an upper surface of the base, a beam portion that connects the leg parts, and a beam-direction moving body that moves along the beam portion,
the air bearing is provided at a rear surface of at least one of the leg parts, and comprises an air blowout port that opens toward an upper surface of the base and an air suction port that opens toward the upper surface of the base, and
the air suction port sucks air around the air suction port to apply preload to the air bearing.

2. The gate-type moving body according to claim 1, wherein the air bearing incorporates an ejector for generating negative pressure, and the gate-type moving device does not have a negative pressure generating device for supplying negative pressure to the air bearing.

3. The gate-type moving body according to claim 2, wherein the ejector is provided detachably inside the air bearing.

4. The gate-type moving body according to claim 3, wherein the air bearings are provided at rear surfaces of the two leg parts.

5. The gate-type moving body according to claim 3, wherein the air bearing is provided to at least one of the leg parts, and the air blowout port and the air suction port are disposed to face a side surface of the base.

6. The gate-type moving body according to claim 3, wherein a driving means of the gate-type moving body is a friction driving means.

7. The gate-type moving body according to claim 3, wherein the beam-direction moving body is provided with a spindle that is movable in a vertical direction with respect to the base, and the gate-type moving device is a three-dimensional measuring machine that can detect a position coordinate of a measurement target placed on the base to measure a three-dimensional shape of the measurement target.

8. The gate-type moving body according to claim 2, wherein the air bearings are provided at rear surfaces of the two leg parts.

9. The gate-type moving body according to claim 2, wherein the air bearing is provided to at least one of the leg parts, and the air blowout port and the air suction port are disposed to face a side surface of the base.

10. The gate-type moving body according to claim 2, wherein a driving means of the gate-type moving body is a friction driving means.

11. The gate-type moving body according to claim 2, wherein the beam-direction moving body is provided with a spindle that is movable in a vertical direction with respect to the base, and the gate-type moving device is a three-dimensional measuring machine that can detect a position coordinate of a measurement target placed on the base to measure a three-dimensional shape of the measurement target.

12. The gate-type moving body according to claim 1, wherein the air bearings are provided at rear surfaces of the two leg parts.

13. The gate-type moving body according to claim 12, wherein a driving means of the gate-type moving body is a friction driving means.

14. The gate-type moving body according to claim 13, wherein the beam-direction moving body is provided with a spindle that is movable in a vertical direction with respect to the base, and the gate-type moving device is a three-dimensional measuring machine that can detect a position coordinate of a measurement target placed on the base to measure a three-dimensional shape of the measurement target.

15. The gate-type moving body according to claim 12, wherein the beam-direction moving body is provided with a spindle that is movable in a vertical direction with respect to the base, and the gate-type moving device is a three-dimensional measuring machine that can detect a position coordinate of a measurement target placed on the base to measure a three-dimensional shape of the measurement target.

16. The gate-type moving body according to claim 1, wherein the air bearing is provided to at least one of the leg parts, and the air blowout port and the air suction port are disposed to face a side surface of the base.

17. The gate-type moving body according to claim 16, wherein a driving means of the gate-type moving body is a friction driving means.

18. The gate-type moving body according to claim 16, wherein the beam-direction moving body is provided with a spindle that is movable in a vertical direction with respect to the base, and the gate-type moving device is a three-dimensional measuring machine that can detect a position coordinate of a measurement target placed on the base to measure a three-dimensional shape of the measurement target.

19. The gate-type moving body according to claim 1, wherein a driving means of the gate-type moving body is a friction driving means.

20. The gate-type moving body according to claim 1, wherein the beam-direction moving body is provided with a spindle that is movable in a vertical direction with respect to the base, and the gate-type moving device is a three-dimensional measuring machine that can detect a position coordinate of a measurement target placed on the base to measure a three-dimensional shape of the measurement target.

* * * * *